A. LAFFOND.
BICYCLE PROPELLING MECHANISM.
APPLICATION FILED JULY 23, 1912.

1,089,483.

Patented Mar. 10, 1914.

2 SHEETS—SHEET 1.

WITNESSES:
John C. Sanders
W. M. Hopping

INVENTOR:
Antoine Laffond
by Wallace White
ATTY

A. LAFFOND.
BICYCLE PROPELLING MECHANISM.
APPLICATION FILED JULY 23, 1912.

1,089,483.

Patented Mar. 10, 1914.
2 SHEETS—SHEET 2.

WITNESSES:
John C. Sanders
W. M. Hopping

INVENTOR:
Antoine Laffond
BY Wallace White
ATT'Y

UNITED STATES PATENT OFFICE.

ANTOINE LAFFOND, OF MARIGNAC-LASCLARES, NEAR LE FOUSSERET, FRANCE.

BICYCLE PROPELLING MECHANISM.

1,089,483. Specification of Letters Patent. Patented Mar. 10, 1914.

Application filed July 23, 1912. Serial No. 711,069.

*To all whom it may concern:*

Be it known that I, ANTOINE LAFFOND, residing at Marignac-Lasclares, near Le Fousseret, Haute-Garonne, Republic of France, rector at Marignac-Lasclares, have invented a Bicycle Propelling Mechanism, of which the following is a full, clear, and exact description.

This invention relates to a bicycle propelling mechanism characterized by a special mechanical combination allowing to actuate the rear wheel of the vehicle by alternately exerting a pressure upon each of the pedals when they are nearly at right angles to the direction of the stress. In this way dead points are avoided. The two cranks of the pedals being set on the same shaft at 180° from each other, the right foot, for instance, acts upon the corresponding pedal, in front of the shaft, while the left foot acts upon the corresponding pedal, but back of the same shaft and this alternately. For allowing this alternate motive action of the two pedal-cranks on the axis of the chain wheel, the shaft of the pedal-cranks is provided with two toothed crowns each having an operating device acting only in the effective direction of the pedal which corresponds to it. The toothed crown of the right pedal gears with an intermediary pinion gearing in its turn with a pinion secured on the axis of the chain wheel. The toothed crown of the left pedal gears directly with a pinion secured on the axis of the chain wheel. It results therefrom that the chain wheel receives its movement on the left side by means of two pinions and on the right side by means of three pinions. Moreover, this mechanism allows, in order to rest, to pedal so as to cause each crank to describe a full revolution as this is done in the existing bicycles. During running, when the cranks are held stationary, the rear wheel of the bicycle becomes free.

Figure 1:
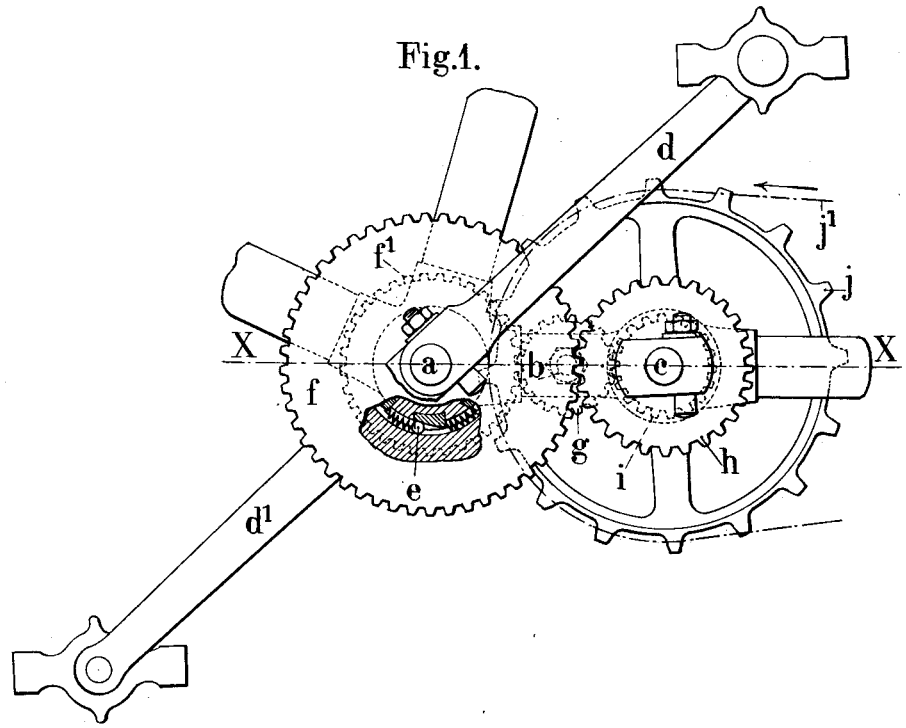
Figure 2:
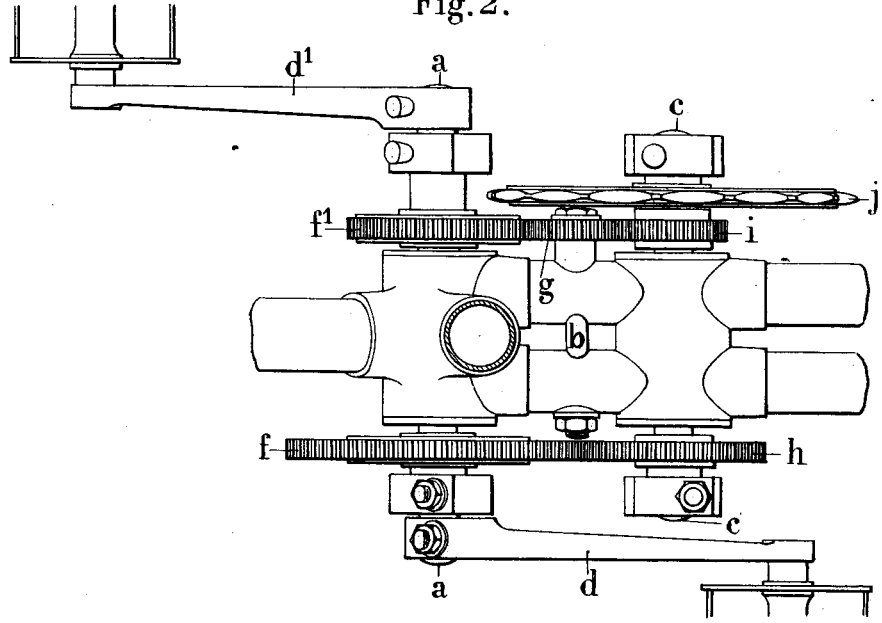
Figure 3:
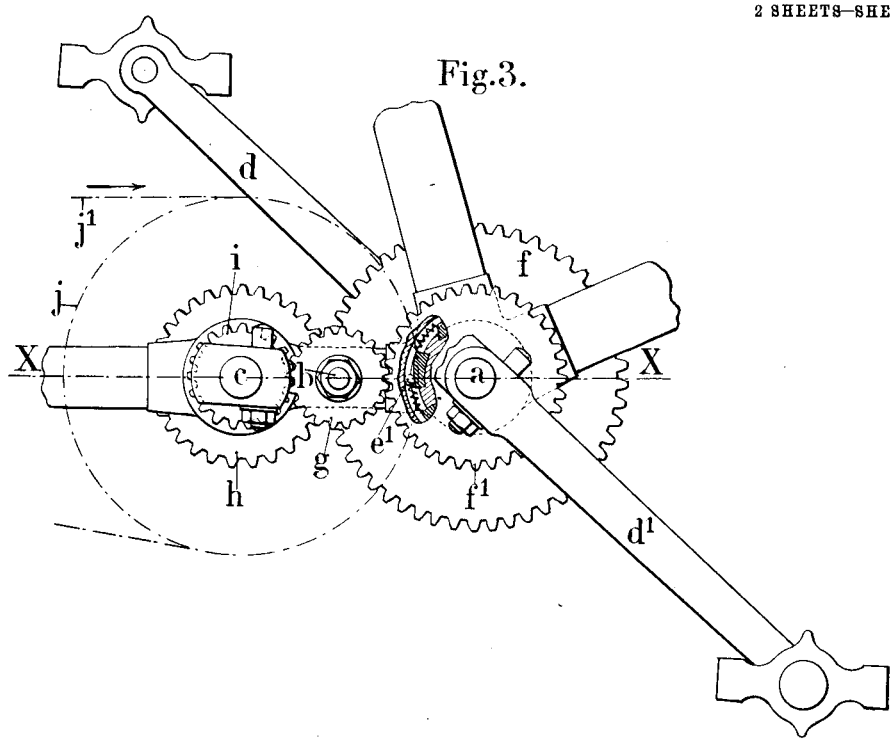
Figure 4:
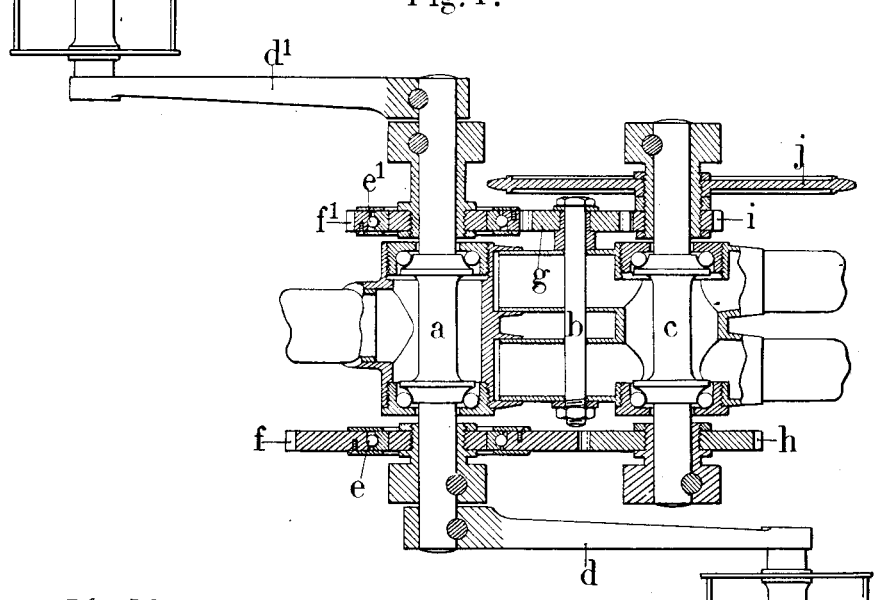

This invention will be described with reference to the accompanying drawings in which:

Figure 1 is an elevation of the bracket on the left hand side, with a part cut away; Fig. 2 is a plan view of the bracket, corresponding to Fig. 1; Fig. 3 is an elevation of the bracket on the right hand side, with a small part cut away; Fig. 4 is a horizontal section of the bracket, corresponding to the plan view of Fig. 2.

As illustrated in the drawing, the mechanical combination constituting this type of bicycle bracket comprises three transverse shafts $a$, $b$, $c$, the shaft $b$ being an intermediary shaft; the axes of said shafts are aranged according to a horizontal line X—X.

On the shaft $a$ are rigidly secured two pedal-cranks $d$ and $d^1$ and two free wheel operating ball devices $e$ $e^1$. These operating devices are surrounded by toothed crowns $f$ $f^1$. The left toothed crown $f$ is actuated from the front toward the rear and is loose in the other direction, while the right toothed crown $f^1$ is actuated from the rear toward the front and is loose in the other direction. The intermediary shaft $b$ carries a loose pinion $g$. The shaft $c$ carries at the left hand side a pinion $h$ and at the right hand side a pinion $i$ as well as the wheel $j$ of the chain $j^1$.

On the left hand side the crown $f$ of the shaft $a$ of the pedal-cranks gears with the pinion $h$ of the shaft $c$ of the chain wheel $j$. On the right hand side, the crown $f^1$ of the shaft $a$ of the bracket gears with the loose intermediary pinion $g$ and the latter gears in its turn with the pinion $i$ secured on the shaft $c$ of the chain wheel $j$. The ratios of the gears are the same on both sides of the bracket.

By horizontally arranging the right pedal $d^1$ in front and the left pedal $d$ in the rear and then by producing a pressure with the foot upon each of the pedals, each of the latter will have an up and down movement when it is nearly at right angles to the direction of the stress. The left pedal $d$ arranged in the rear will rotate the corresponding toothed crown $f$ from the front toward the rear, said crown in its turn will directly rotate its pinion $h$ and the wheel $j$ of the chain $j^1$ for actuating the rear wheel of the bicycle in the direction of the running. The right pedal $d^1$ arranged in front will rotate the corresponding toothed crown $f^1$ from the rear toward the front, said crown in its turn will rotate from the front toward the rear the intermediary pinion $g$, thus driving from the rear toward the front the pinion $i$ integral with the wheel $j$ of the chain $j^1$.

The chain $j^1$ passes to the rear upon a free wheel device pinion mounted on the axis of the driving wheel of the bicycle.

In order that the rider may rest, he can pedal so as to cause each pedal to describe a full circle as this done in the existing bicycles. Finally, during running, by holding the cranks stationary, the rear wheel of the bicycle becomes free.

Claims:

1. In bicycle propelling mechanism, in combination, a driven shaft, a driving shaft adapted to be rocked, and means interposed between said shafts for causing the rocking movement of said driving shaft to transmit a unidirectional rotary movement to said driven shaft.

2. In bicycle propelling mechanism, in combination, a driven shaft, a driving shaft, a pair of gears mounted upon said driving shaft, means for rendering one only of said gears operative when said driving shaft rotates in one direction, means for rendering the other one only of said gears operative when said driving shaft rotates in the opposite direction, and means interposed between said pair of gears and said driven shaft to impart a unidirectional rotation thereto when said driving shaft is rocked.

3. In bicycle propelling mechanism, in combination, a driven shaft, a driving shaft, a pair of pinions fixed to said driven shaft, a pair of gears mounted upon said driving shaft, means for rendering one only of said gears operative when said driving shaft rotates in one direction, means for rendering the other one only of said gears operative when said driving shaft rotates in the other direction, one of said gears meshing directly with one of said pinions, and an intermediate pinion interposed between and meshing with the other of said gears and the other of said mentioned pinions, whereby a unidirectional rotation is imparted to said driven shaft when said driving shaft is rocked.

The foregoing specification of my bicycle bracket signed by me this ninth day of July 1912.

ANTOINE LAFFOND.

Witnesses:
R. THIRIOT,
LUCIEN MEMMINGER.

Copies of this patent may be obtained for five cents each, by addressing the "Commissioner of Patents, Washington, D. C."